Feb. 10, 1925.

D. F. MORGAN

HEADER

Filed Oct. 4, 1923  2 Sheets-Sheet 1

1,525,821

Inventor
D. F. Morgan

By Jack A. Ashley
Attorney

Feb. 10, 1925.
D. F. MORGAN
HEADER
Filed Oct. 4, 1923    2 Sheets-Sheet 2
1,525,821
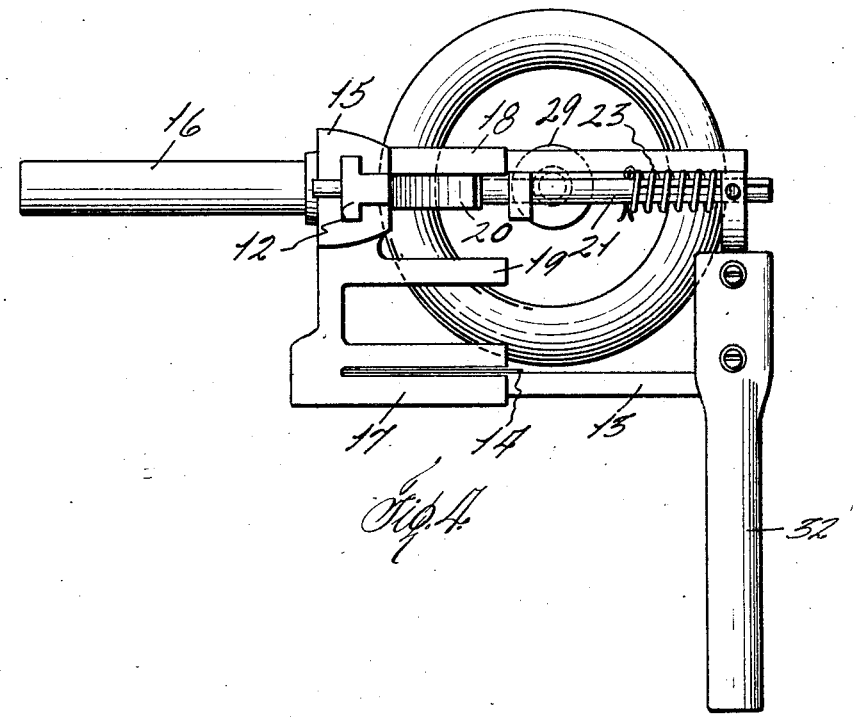
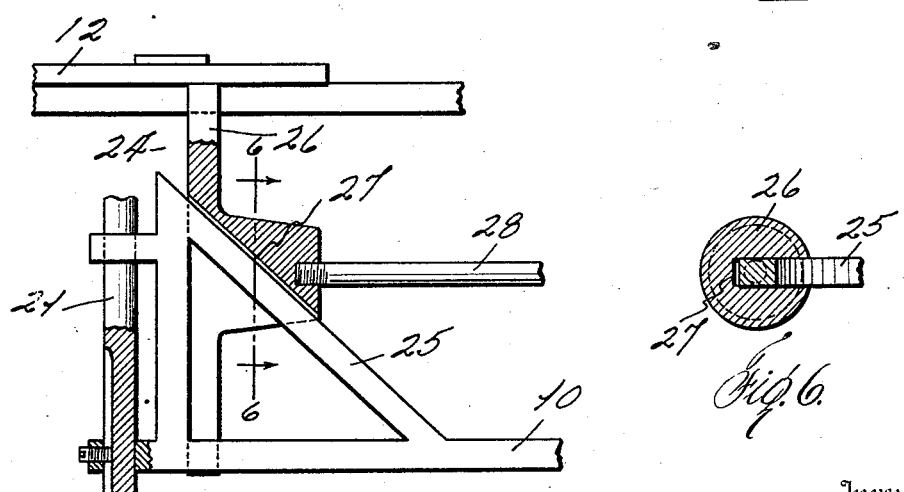
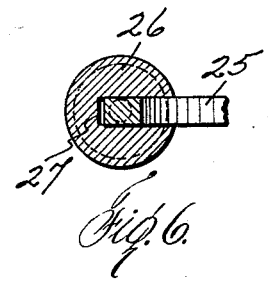
Inventor
D. F. MORGAN
By Jack A. Ashley
Attorney Patented Feb. 10, 1925.

1,525,821

UNITED STATES PATENT OFFICE.

DANIEL F. MORGAN, OF FORT WORTH, TEXAS.

HEADER.

Application filed October 4, 1923. Serial No. 666,451.

*To all whom it may concern:*

Be it known that I, DANIEL F. MORGAN, a citizen of the United States of America, residing at Fort Worth, in the county of Tarrant and State of Texas, have invented certain new and useful Improvements in Headers, of which the following is a specification.

This invention relates to new and useful improvements in headers.

The object of the invention is to provide an improved hand implement for severing the heads from the stalks and for use in cutting milo maize, kaffir and broom corn and other head crops.

A particular object is to provide a reciprocating cutter capable of convenient, easy and clean cutting.

A further object is to provide means for collecting and holding the heads as cut.

Another object is to provide means for automatically releasing the collected heads when the implement is carried through a pitching movement whereby the heads may be discharged into a wagon.

A still further object is to provide a header which will be rapid, efficient and practical in operation.

A construction designed to carry out the invention will be hereinafter described together with other features of the invention.

Figure 1:
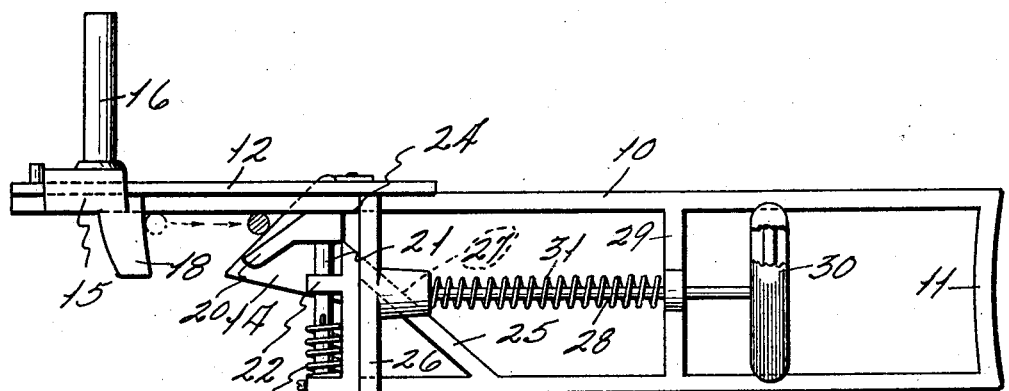
Figure 2:
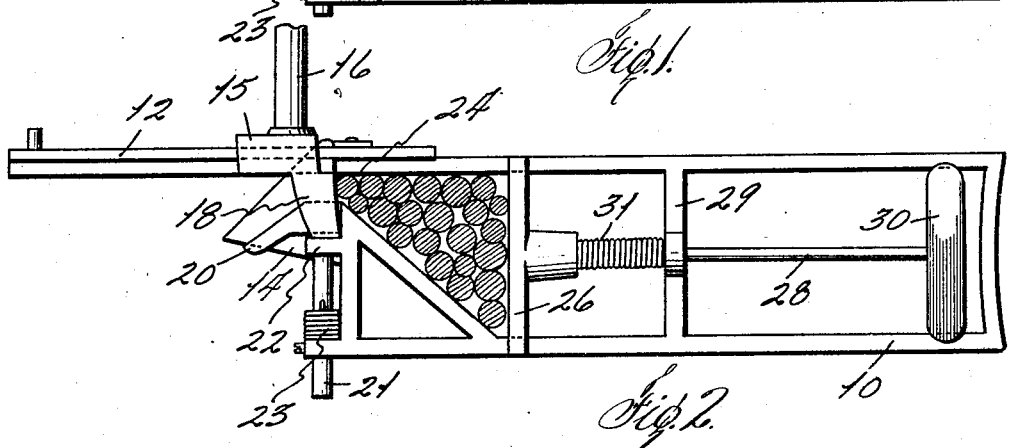
Figure 3:
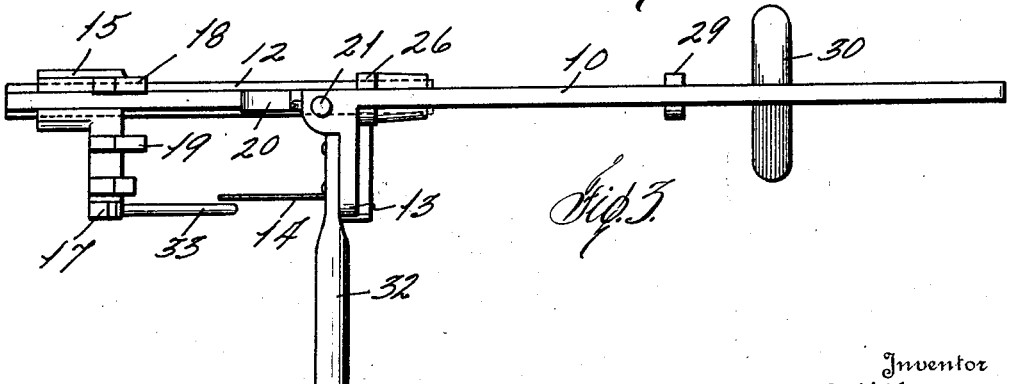

The invention will be more readily understood from a reading of the following specification and by reference to the accompanying drawings, in which an example of the invention is shown, and wherein;

Fig. 1 is a plan view of an implement constructed in accordance with my invention showing the jaw open, Fig. 2 is a similar view showing the jaw closed and heads collected, Fig. 3 is a side elevation, Fig. 4 is a front end view, Fig. 5 is a detail of the follower, and Fig. 6 is a cross-sectional view on the line 6—6 of Fig. 5.

In the drawings the numeral 10 designates an elongated frame of suitable construction and preferably of metal. At the inner end is formed an arm rest 11. A slide rail 12, T-shape in cross section, extends forwardly from the outer end of the frame and at one side thereof. A stirrup 13 depends transversely of the front or outer end of the frame and has mounted therein a cutter blade 14.

A gathering and shearing slide 15 is mounted to slide on the rail and is provided with a handle 16 by which it may be manipulated. At the lower end of the slide is a laterally directed finger 17, bifurcated to straddle the blade 14 when the slide is moved to the stirrup. The slide carries another finger 18 at the rail and an intermediate finger 19 below the rail. The fingers are slightly curved so that when engaged with a stalk they will tend to force it against the rail. By means of the slide the stalk is carried to the blade 14 which has its cutting edge at an acute angle to the rail, thus forming a throat for the reception of the stalk.

The severed head is carried by the slide across the blade and engaged with a latch 20 mounted on the end of a transverse plunger 21 supported in lugs 22 and impelled by a coiled spring 23. An opening 24 in the end of the frame admits the stalks of the heads and a guide bar 25 prevents under spreading of the stalks within the frame. After the stalk passes the latch the latter returns and acts as a keeper. A follower head 26 has its ends forked and riding on the sides of the frame. The head is slotted at 27 to receive the bar 25 as is shown in Fig. 5.

The head holds the stalks collected in the frame. A plunger rod 28 extends from the head through a cross bar 29 in the frame and has a hand ring 30 secured on its end and slidable on the frame 10. A coiled spring 31 encircles the rod 28 between the head and the bar 29 and acts to force the head in contact with the collected stalks. A handle 32 depends from the lower end of the stirrup 13 at right angles to the handle 16.

In using the device the operator grasps the handle 32 with his left hand and the handle 16 with his right hand and places the rest 11 against the upper portion of his left arm. He then slides the slide 15 outwardly on the rail 12, whereby the jaw formed between the fingers 17, 18 and 19 and the blade 14 is opened. He next places the rail 12 within the jaw against the stalk just under the head of corn or grain which is to be severed and then pulls the slide, whereby the stalk is carried onto the blade and the head severed. If desired, a guide prong 33 may be mounted on the slide below the rail to hold the stalk against the knife during the severing operation.

After the head is severed, a continued movement of the slide engages the stalk below the head with the latch 20 which is displaced so that the stalk enters the slot 24 and engages the cross-head 26. The slide is then returned for the next operation. As the heads are collected in the frame the cross-head is displaced inwardly, whereby the heads are held in a bunch. When a number of heads have been collected the operator grasps the hand ring 30 and gives the implement a pitching movement in the direction of the wagon which is being driven along the row. This retracts the cross-head 26 whereby the heads are released and are pitched into the wagon.

Various changes in the size and shape of the different parts as well as modifications and alterations may be made within the scope of the appended claims.

What I claim, is:

1. A manually supported header comprising a frame having means for its support by an operator, a fixed cutter blade carried by the frame, a collecting device upon the frame, and a sliding member mounted upon the frame and constructed to gather stalks, force them into contact with said blade, and into said collecting device when cut.

2. In a header of the character described, an elongated frame having an arm rest at one end, a cutter blade at the opposite end of the frame, a sliding member mounted on the frame, and co-acting with the blade for gathering and severing stalks, means for collecting the severed heads within the frame, and a hand operated member for releasing the collected head when the frame is pitched.

3. In a header of the character described, an elongated frame having an arm rest at one end, a cutter blade at the opposite end of the frame, a slide rail at the cutter end of the frame, a slide mounted on said rail and having fingers co-acting with said cutter, and means for collecting the severed heads in the frame.

4. In a header of the character described, an elongated frame having an arm rest at one end, a cutter blade at the opposite end of the frame, a slide rail at the cutter end of the frame, a slide mounted on said rail and having fingers coacting with said cutter, a latch on the frame, said frame having a head collecting portion provided with an entrance opening controlled by said latch, and a spring actuated follower head mounted on the collecting portion of the frame.

In testimony whereof I affix my signature.

DANIEL F. MORGAN.